United States Patent
Kirk et al.

(10) Patent No.: US 6,175,842 B1
(45) Date of Patent: *Jan. 16, 2001

(54) SYSTEM AND METHOD FOR PROVIDING DYNAMIC THREE-DIMENSIONAL MULTI-USER VIRTUAL SPACES IN SYNCHRONY WITH HYPERTEXT BROWSING

(75) Inventors: Thomas Kirk, Warren; Peter Gilman Selfridge, Watchung, both of NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/888,139

(22) Filed: Jul. 3, 1997

(51) Int. Cl.[7] .................................................. G06F 17/30
(52) U.S. Cl. ........................ 707/513; 345/349; 707/3; 707/4; 707/5; 707/10; 707/501; 707/513; 707/517; 709/202; 709/206; 709/219
(58) Field of Search .................... 395/200.49; 345/429, 345/355, 349, 351; 707/517, 3, 4, 5, 10, 501, 513; 709/202, 206, 219

(56) References Cited

U.S. PATENT DOCUMENTS

| | | | |
|---|---|---|---|
| 5,694,559 | * 12/1997 | Hobson et al. | 707/3 |
| 5,737,533 | * 4/1998 | De Hond | 709/219 |
| 5,801,707 | * 9/1998 | Rolnik et al. | 345/429 |
| 5,802,530 | * 9/1998 | Van Hoff | 707/513 |
| 5,808,613 | * 9/1998 | Marrin et al. | 345/355 |
| 5,870,549 | * 2/1999 | Bobo, II | 709/206 |
| 5,883,628 | * 3/1999 | Mullaly et al. | 345/355 |
| 5,889,951 | * 3/1999 | Lombardi | 709/219 |
| 5,903,902 | * 5/1999 | Orr et al. | 707/517 |
| 5,905,814 | * 5/1999 | Mochizuki et al. | 382/239 |

OTHER PUBLICATIONS

Carmel, E. et al., "Browsing in hypertext: a cognitive study", IEEE transaction on System, Man and Cybernetics, Sep.–Oct. 1992, vol. 22, Issue: 5, pp. 865–884Sep. 1992.*

Johnson, R. B. "Internet Multimedia Databases", IEE Colloquium on Multimedia Databases and MPEG–7 (ref. No. 1999/056), Jan. 29, 1999, pp. 1–7 Jul. 1999.*

Frecon et al., "Webpath–a three dimensional Web history", Proceedings IEEE symposium of Information Visualization, 1998, Oct. 1998, pp. 3–10 and 148.*

(List continued on next page.)

Primary Examiner—Hosain T. Alam
Assistant Examiner—Shahid Alam
(74) Attorney, Agent, or Firm—Kenyon & Kenyon

(57) ABSTRACT

A system and method is described for providing shared access to a three dimensional virtual environment synchronously with hypertext browsing. A cospace server receives a messages indicating requests for hypertext files on a network from a client. The cospace server tracks the requests and stores components or the addresses of components of the requested hypertext files. When a threshold number of clients have requested a hypertext file, the cospace server constructs a virtual three dimensional room description and sends it to the clients that are browsing the file. The virtual three dimensional room description is rendered as a virtual three dimensional room at the client, and typically includes portals to other virtual three dimensional rooms. A user is represented in the virtual room as an avatar, and can communicate with other users at other clients. The present invention enhances an installed base of conventional hypertext files such as the World Wide Web with three dimensional and social features without having to carry out any modifications of the hypertext files where they are stored.

23 Claims, 3 Drawing Sheets

OTHER PUBLICATIONS

Jasnoch et al., "Shared 3D environments within a virtual prototyping environment", Proceeding of the 5th Workshop on Enabling Technologies: Infastructure for Collaborative Enterprises, 1996. Jun. 19, 1996, pp. 274–279.*

Rogers et al., "Navigating the virtual library: a 3D browsing interface for information retrieval", Proceeding of the 1994 Second Australian and New Zealand Conference on Intelligent Information System, 1994, Nov. 24, 1994, pp. 467–471.*

* cited by examiner

SYSTEM AND METHOD FOR PROVIDING DYNAMIC THREE-DIMENSIONAL MULTI-USER VIRTUAL SPACES IN SYNCHRONY WITH HYPERTEXT BROWSING

BACKGROUND OF THE INVENTION

The field of this invention is providing three dimensional (3-D) multi-user virtual spaces in synchrony with hypertext browsing, and more particularly constructing and displaying a virtual three dimensional space based upon the determination that a user is browsing hypertext files at a network site, populating that space with other users who are visiting the site, using site-to-site transition data to construct portals between virtual three dimensional rooms comprising the space, and using avatar movement between three dimensional rooms to drive client software that displays the space to the user.

A known method for presenting information to users connected to a network uses hypertext techniques wherein the presented information includes user-selectable areas, called "links", which function as gateways to further information. An example of a system that provides hypertext information to users is the World Wide Web (WWW) on the Internet. The WWW is a collection of websites. Each website includes a collection of hypertext files, often pertaining to a single theme. Website files are stored on a computer on the Internet called a web server, which is a server connected to the Internet and having an Internet Protocol (IP) address. A user connects to the Internet through a computer and executes software called a browser. The browser sends the user's request for hypertext information to a website, and receives, consolidates, and displays the requested hypertext information to the user.

The hypertext files stored on websites are usually presented in known systems to the user in a two-dimensional (2-D) format, although some known sites on the WWW present content in a 3-D format. Known 2-D browsers present a hypertext file to a user much as a document on a piece of paper is presented to a reader. The term "web page" denotes a hypertext file on the WWW as presented to a user. The principal difference between a hypertext page and a page on paper is that a hypertext page includes links to other pages. When a link is selected by a user using a mouse or other pointing device, the linked-to page is then automatically displayed by the browser to the user. The WWW user is able to navigate from web page to web page (and even across websites hosted on different computers) to view information that the user selects as pertinent to the user's needs. This mode of browsing to new hypertext pages using links is more flexible and interactive for the user than the printed document is for the reader.

Links in hypertext files can also be associated with files representing other media (i.e., besides other hypertext files) such as graphics, audio clips, video clips, animation, text, or any combination thereof. Selecting such links causes the appropriate software application to execute and display the alternative media files (for example, a QuickTime™ application will display a video clip). Links can also be associated with executable programs (e.g., common gateway interface programs) that carry out various functions. Streamed information (e.g., streamed audio, video, etc.) can also be associated with a link in a hypertext file. When selected, a streamed media application is executed that plays the streamed data (e.g., in the form of music, video, etc.) to the user.

An example of a known WWW browsing system is shown in FIG. 1. Clients A 101, B 102 and C 103 each execute browsers (not shown) and are connected to a network 104, which in this case is the Internet. Web server computers A 105 and B 106 are also connected to the Internet 104. A request for a hypertext file is sent from client A 101 to web server B 106. Web server B sends the file to client A, where it is displayed as a two-dimensional page to the user 107.

Known WWW browsers only support solitary browsing by individual users at their client computers. Users are not aware of each other and there is no supported interaction or communication between different users, even if they are browsing the same website, or even the same web page.

Other known systems present virtual reality environments to users through a network. A virtual reality (VR) environment is a computer-displayed three-dimensional environment with which a user is able to interact (e.g., "move" through, "kick" a virtual 3-D ball) using input and output devices at the user's computer. Known VR systems include VR browsing software that is executed on the user's computer. VR browsing software can be a stand-alone program, as in the VR browser made by the Oz Virtual Company of Iceland. Alternatively, VR browsing software can be software that executes in association with other software, such as the Cosmo Player by SGI, Incorporated which runs within the Netscape Navigator hypertext browser made by the Netscape Communications Company of California as a series of plug-ins, using Java as its user interface. The VR browser sends the user's request for VR data to a computer on a network (e.g., a VR server on the Internet) to send a VR file. A VR file describes a 3-D scene or environment. When the browser receives the VR file, it displays (renders) the described 3-D scene on the client computer. An example of a VR file is one that is written in Virtual Reality Modeling Language (VRML).

An example of a VR system is shown in FIG. 2. Clients A 201, B 202 and C 203 are connected to network 204. VR servers A 205 and B 206 that store the layouts of VR environments are also connected to network 204. Client A 201 executes a VR browser (not shown) through which it sends a request to VR server B 206. VR server B 206 responds by sending VR data to client A 201, which is displayed to the user 207. User 207 provides input to client A 201 by which the user "moves" through the VR environment scene whose description is stored on server B 206. These inputs are interpreted by the browser on client A 201 to change the view of the VR scene whose description was obtained from VR server B to the user 207. When the user's input necessitates obtaining further VR description data from server B 206, the browser on client A 201 sends a request to server B 206 for the needed information. Server B 206 responds by sending the data to client A 201.

The system shown in FIG. 2 allows the presentation of 3-D information to the user and allows the user to interact with the information by navigation, as if the user was "in" the environment. This enables a new and complementary set of user experiences over the network to that of conventional browsing.

However, the system shown in FIG. 2 does not support social interactions among different users. Two users viewing the same VR environment cannot interact or communicate with each other using the system shown in FIG. 2.

Certain known systems support social interaction among users viewing the same VR environment. In the system shown in FIG. 3, clients A 301, B 302 and C 303 browse a VR environment whose description is stored on VR server 304 through network 305. Clients A 301, B 302 and C 303 send requests to server 304 for VR descriptive data, which is sent by server 304 to clients A 301, B 302 and C 303, where various views of the VR environment are displayed to users 306, 307 and 308. Each client executes multi-user software that is designed to interact with multi-user server 309. This software is a part of the VR browser executed by each client, or else is a separate program that executes in tandem with the VR browser.

The multi-user software allows each user to select an avatar to represent the user in the displayed VR environment. An avatar is a virtual representation of a user in a VR environment. It usually appears as a figurine or just the head of a figure. The user is able to move and interact in the VR by providing input to the user's avatar using client input devices. Avatar locations are tracked by the multi-user server, and avatar update information is periodically broadcast to all of the clients. The multi-user software on the clients then update the positions of the avatars displayed to their respective users. The multi-user software further allows users to interact socially with each other by allowing communications between users. Avatar location and communications data is exchanged between the clients and the multi-user server. Textual communications are relayed from one user to another using chat a channel, usually a text-based "chat window" at the bottom of each user's display. In another system, voice communications are relayed between users using microphones and speakers.

A shortcoming of known VR systems is the lack of conversational topic focus, which arises because multi-user participants may have little or nothing in common besides their virtual presence in the VR environment. Another problem is that the scope of the VR environment is limited to that provided by the environment's designer. No extensions or enhancements are typically allowed in known systems.

A better VR environment would provide individuals with some indication of common interest, facilitating group communication among like-minded individuals.

A VR system would also be better if it would bring the 3-D and social advantages of VR browsing to a large installed base of information without requiring the extensive and expensive customization of information required by known systems. Further, the ideal VR system would be dynamically extendible as the installed base of information grows, and it would allow users to create new VR environments that can be seamlessly integrated with the existing VR environment.

SUMMARY OF THE INVENTION

The present invention advantageously provides to a user browsing conventional hypertext files a dynamically constructed three-dimensional VR environment in which the user can interact and communicate with other users. The VR environment in accordance with the present invention comprises dynamic 3-D rooms created in synchrony with hypertext browsing, and dynamically created doorways (called "portals") linking 3-D rooms, thereby representing hypertext browsing behavior in a virtual 3-D enhanced environment.

The present invention includes a cospace server connected to a network that tracks the hypertext files browsed by a set of users. When a user, through a client, requests a hypertext file from a site over a network, that request is captured and recorded by a computer connected to the network. In one embodiment of the present invention, this request is captured by a proxy server and forwarded to the cospace server. In another embodiment, the request is sent directly from the client to the cospace server. The captured request is tracked by the cospace server, and includes the identity of the user requesting the file and the identity of the requested file to the cospace server. In one embodiment, the cospace server tracks user activity for each hypertext file. In another embodiment, the cospace server tracks usage for a group of hypertext files. When a usage threshold (e.g., a minimum number of browsing users) or other criteria is reached for the tracked file, the cospace server generates a 3-D VR room description. In one embodiment, the room description corresponding to the file. In another embodiment, the room description is created independently from the file, and derives no components from the file. In this embodiment, the room description is comprised of features stored in a database connected to the cospace server. In yet another embodiment, the room description is comprised of some features from the corresponding file, and some features stored independently on the database connected to the cospace server. Once activity tracked at a site meets predetermined criteria and the room description is constructed, the room description is sent from the cospace server to clients to be displayed as a three dimensional virtual room.

Portals can be included in 3-D virtual rooms that lead to other 3-D virtual rooms. In one embodiment of the present invention, portals from a first room correspond to hypertext files known to be commonly visited by users from a file or site corresponding to the first room. In another embodiment, portals in a first room lead to other files or sites determined to be advantageously associated with the file or site corresponding to the first room. Portals can also connect a first room corresponding to a file or site to a second room that is constructed independently of any file or site, e.g., from features stored in the database connected to the cospace server.

The present invention advantageously provides a user with an avatar. The user can see avatars of other users in the environment, can navigate her avatar through the environment (e.g., through portals to other rooms), and can communicate with other users. A multi-user server is used in known fashion to coordinate and update avatar movements of one or more users and exchange communications data between users and to communicate other local shared state of objects in the 3-D VR environment.

The VR environment can be synchronized at the user's request with the conventional hypertext browser as follows. If a user navigates her avatar from one 3-D room to another 3-D room through a 3-D portal, that movement is communicated to the cospace server. The cospace server then communicates to the user's conventional hypertext browser to request the conventional hypertext file associated with the newly visited 3-D room.

The VR environment can include 3-D features that represent salient features of the file upon which it is based, including hypertext links, graphics, etc. The VR environment may be custom decorated by users, and may include portals to other VR environments on the network.

The present invention substantially enriches the large installed base of hypertext files on websites of the WWW on the Internet by providing dynamic, 3-D VR rooms that can be associated with such hypertext files, and by enabling communication and collaboration with other browsing users. The present invention advantageously brings together a group of users who are browsing the same file or site by allowing them to communicate and associate with each other in a room corresponding to that file or site. Users conventionally browse a site anonymously to each other. For example, hundreds of individual users of the Microsoft Internet Explorer browsing a single hypertext file typically do so unaware of each other's activities on the site to which the file belongs, and without communicating or sharing the browsing experience with each other. Further, the present invention advantageously does not require any modification of the hypertext files on which it operates or of the server from which those files are transmitted.

The present invention also enables other collaborative, multi-user capabilities, such as the ability to tour the WWW as a spontaneously-formed group while maintaining group communications, the ability to collaboratively "vote" on the next stop in the tour, and the ability to attend and participate in a 3-D business meeting enhanced by shared and collaborative WWW browsing.

The present invention also provides for the seamless integration of other 3-D VR environments constructed by organizations or individuals into the dynamically constructed VR environment provided by the invention.

DETAILED DESCRIPTION

Figure 1:
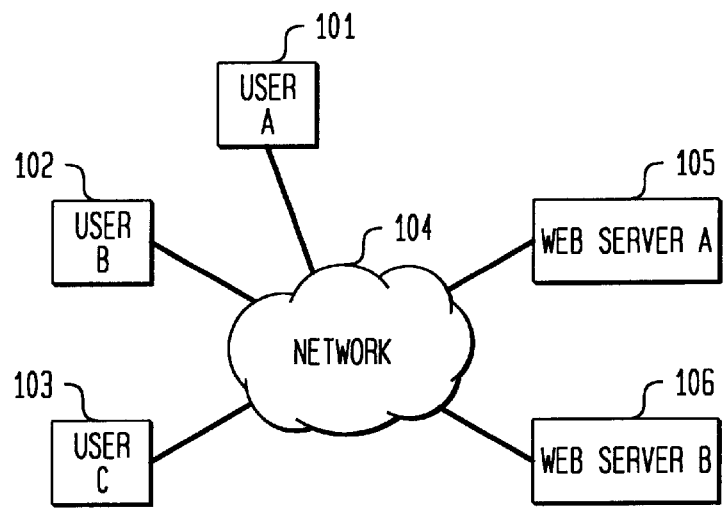
FIG. 1 shows an embodiment of a prior art 2-D website browsing system.
Figure 2:
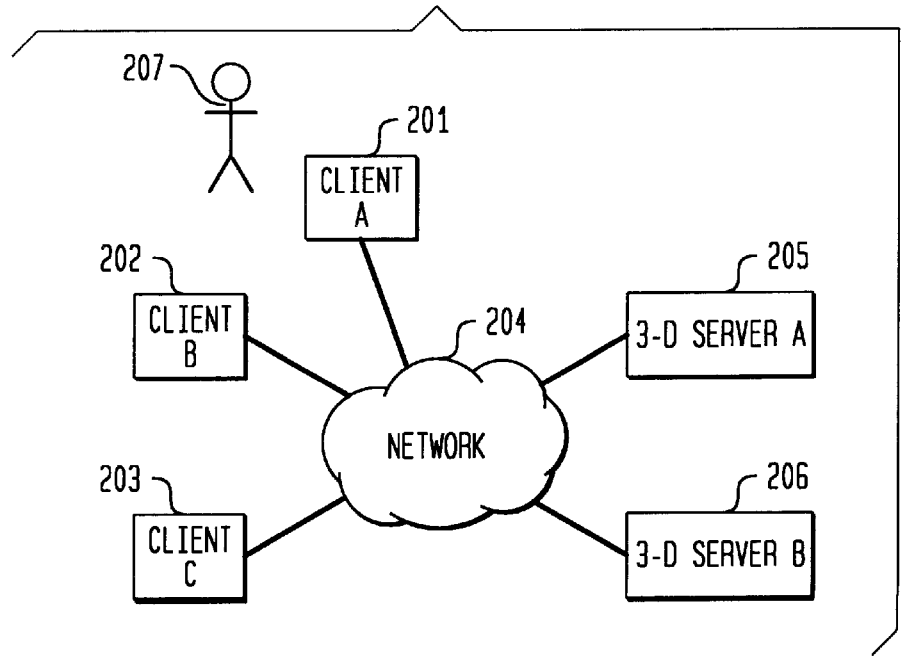
FIG. 2 shows an embodiment of a prior art 3-D virtual reality browsing system.
Figure 3:
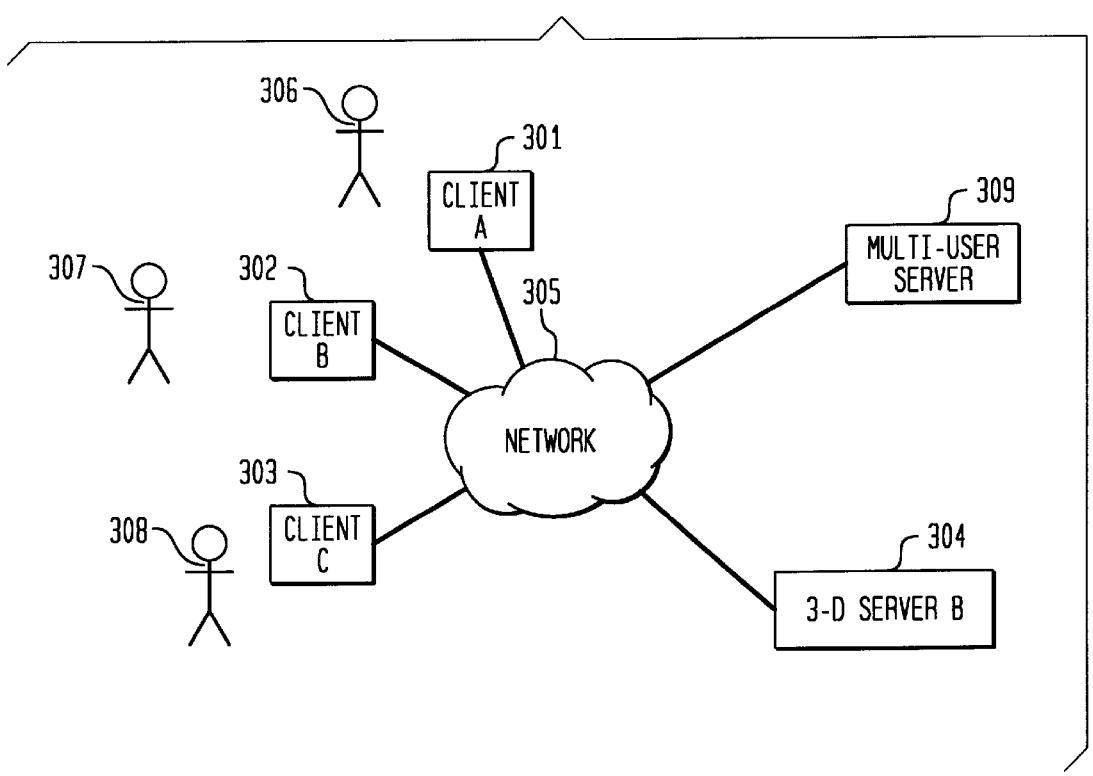
FIG. 3 shows an embodiment of a prior art 3-D virtual reality browsing system that supports avatars and communications between users.
Figure 4:
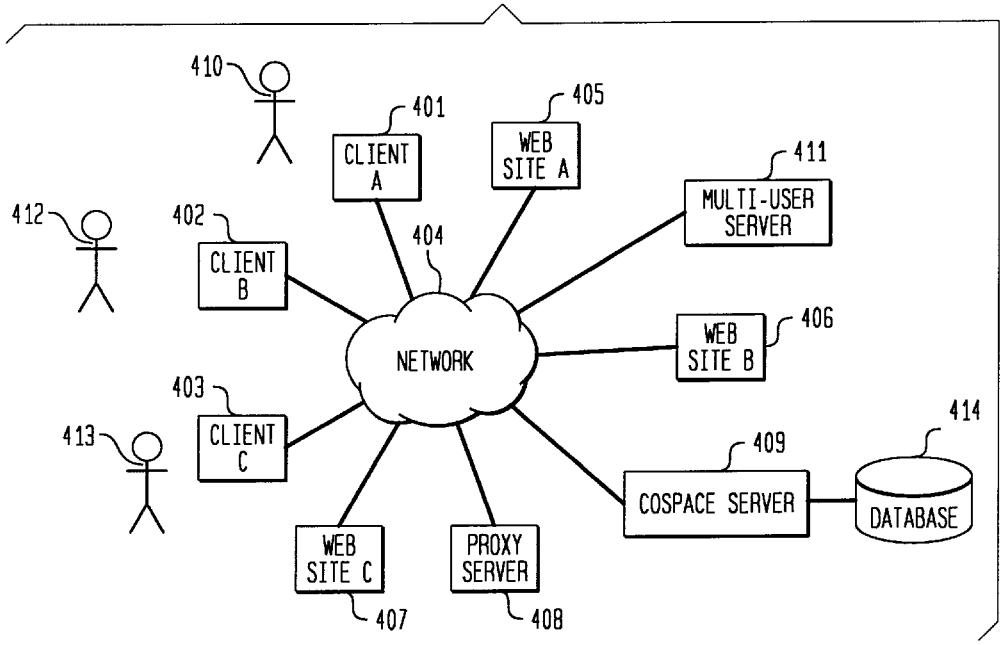
FIG. 4 shows an embodiment of a system that supports shared access to a 3-D virtual environment synchronously with hypertext browsing in accordance with the present invention.

An embodiment of a system in accordance with the present invention is shown in FIG. 4. Clients A 401, B 402 and C 403 are connected to a network 404. Examples of network 404 include the Internet; an Intranet; a Local Area Network (LAN); and a Wide Area Network (WAN). In the embodiment shown in FIG. 4, network 404 is the Internet. A client is a computer comprising a processor; memory; a port to be connected to an input device; a port to be connected to an output device; a port to be connected to a network; an electronic data bus connecting the processor, memory, and ports; an input device connected to the input port; and an output device connected to the output port. Examples of input devices include a keyboard; a mouse; a joystick; a camera; and a microphone. Examples of output devices include a video monitor; a printer; and a speaker. In another embodiment, the network 404 is an Intranet.

Also connected to the network 404 are sites A 405, B 406 and C 407. A site is a server that stores at least one hypertext file and the software necessary to service network requests directed to that site (i.e., web server software). A site server comprises a processor; computer readable memory; a port to be connected to a network; and an electronic data bus that connects the processor, memory and port. In the embodiment shown in FIG. 4, sites A 405, B 406 and C 407 are websites on the WWW.

In accordance with the present invention, client A 401 sends a request to obtain a hypertext file at site B 406. In the one embodiment of the present invention, this request is sent to a proxy server 408 connected to network 404. In another embodiment, it is sent directly from the client A 401 to site B 406 through network 404.

In the embodiment where the hypertext file request is received by proxy server 408 from client A 401, proxy server 408 then sends a request to site B 406 to send the requested file to the proxy server 408, through which the file is sent to the requesting client A 401. The proxy server 408 also keeps track of components of the hypertext file, including a list of graphics sent from site B 406 in response to client A's 401 request forwarded by proxy server 408. The proxy server 408 sends a message to a cospace server 409, also connected to network 404, indicating the identity of the requesting client, client A 401, and a location identifier of the hypertext file requested by the client. In one embodiment of the present invention, the location identifier is the Uniform Resource Locator (URL) of the requested file. In another embodiment of the present invention, software integrated with the user's browser running on client A 401 keeps track of requested file components and sends client and file identification data to the cospace server 409.

In accordance with the present invention, the cospace server 409 uses the data in messages containing the identity of the client requesting the hypertext file and a location identifier of the hypertext file to track the identities and numbers of users accessing each requested hypertext file. When the number of clients at a given site reaches a predetermined threshold, the cospace server 409 constructs a three dimensional VR room description. In one embodiment, the room description corresponds to the requested hypertext file. In another embodiment, the room description is created independently from the requested hypertext file. For example, an independently created room description can be constructed entirely from room data stored in the database 414 connected to the cospace server 409.

In accordance with the present invention, the cospace server comprises a processor; computer readable memory; a port to be connected to a network; a port to be connected to a database; and an electronic data bus that connects the processor, memory and ports, as well as computer readable instructions (called cospace server software) stored in computer readable memory. The cospace server software is executed by the processor to configure the cospace server into a receiver, a virtual three dimensional room builder, and a sender.

In accordance with the present invention, the receiver receives a message sent from a client over the network. In one embodiment, the receiver comprises the port connected to the network, the data bus, the processor and computer readable memory with instructions. These are configured to cooperate in accordance with message receiving instructions stored in the computer readable memory. The port connected to the network initially receives and conveys the message to the electronic data bus, over which the message is conveyed to the processor. The processor receives the message using receiving instructions (included in cospace server software), which are stored in the computer readable memory and retrieved by the processor over the data bus and executed.

The virtual three dimensional room builder is comprised of the processor, data bus, and computer readable memory with instructions, configured to cooperate in accordance with virtual three dimensional room building instructions stored in the computer readable memory. The processor creates data structures comprising a three dimensional virtual room description based upon data that, in one embodiment, is obtained from a database connected to the cospace server through the database port. The processor creates the room description in accordance with virtual three dimensional room building instructions, which are stored in the computer readable memory and are retrieved and executed by the processor over the data bus.

The sender is comprised of the processor, data bus, computer readable memory with instructions, and port connected to the network, configured to cooperate in accordance with sending instructions stored in the computer readable memory. The processor sends a three dimensional room description to a client by retrieving over the data bus certain sending instructions which are stored in the computer readable memory.

The 3-D VR room description is constructed in one embodiment of the present invention as follows. First the cospace server 409 requests the list of components (graphics, links, or other components of the original hypertext file) from the proxy server 408. The cospace server can access a database 414 of room attributes such as textures, floor plans, and three dimensional decorative objects. The cospace server 409 then constructs a three dimensional VR room description for the hypertext file using a combination of room attributes chosen from a database of possible attributes (for example, a floor plan and wall decoration texture and the list of components of the original hypertext file provided by the proxy server 408.

The cospace server can also access a database 414 containing room attributes associated with a particular hypertext file. For example, some hypertext files can be designated as "premium sites". The 3-D VR room descriptions constructed for those sites are enhanced by the cospace server with additional graphics, objects, and capabilities associated with that hypertext file in the database.

When a new 3-D VR room description is created by the cospace server, it includes a number of 3-D VR doorways, called portals. A portal is a doorway between two 3-D VR rooms and serves to connect a set of 3-D VR rooms together into a larger 3-D VR environment. One kind of portal connects the new 3-D VR room and the previous 3-D VR room displayed by the cospace client software. These represent the browsing behavior of a single individual user on a single client. Such portals (called private portals) can be displayed only on that user's client.

Other portals, called public portals, are added automatically by the cospace server and represent common browsing paths. In the current embodiment, one mechanism for automatically adding public portals is as follows. The cospace server keeps statistics for all clients, including the number of times any user browses from hypertext file A to hypertext file B. If the percentage of users that browse hypertext file A then browse directly to hypertext file B is above a predetermined threshold, the cospace server can automatically create a public portal from the 3-D VR room corresponding to file A to the 3-D VR room corresponding to file B. All users who browse to hypertext file A and view the corresponding 3-D VR room will then see the public portal leading to the 3-D VR room corresponding to hypertext file B.

The cospace server 409 tracks the state of each client, including which hypertext files they have requested, which hypertext file the browser on that client is currently displaying, and which 3-D VR rooms and portals currently being displayed on the client. The cospace server uses this information to send the newly constructed 3-D VR room description to all clients that will need to add the room to their 3-D VR environment. All clients for whom the new room or portals will be visible will need to render the new three dimensional room description on their client's display.

In accordance with the present invention, client A 401 executes cospace client software capable of interfacing with the cospace server and receiving VR room description data corresponding to a requested hypertext file, including portals to other room and their descriptions. The cospace client software then displays the 3-D VR environment to the user 401.

When a 3-D VR environment is displayed, each user appears as an avatar to other users in the environment. This functionality is supported by using a multi-user server 411 as is known in the art to generate, track, and exchange avatar and communications data between users occupying the same VR environment. In accordance with the present invention, user 410 selects an avatar by communicating through client A 401 with multi-user server 411 connected to the network 404. In one embodiment, the user selects an avatar from a set of predetermined avatars. In another embodiment, an avatar is randomly assigned to the user. In yet another embodiment, the user can build her own avatar using an avatar editing tool that enables the user to specify avatar characteristics such as torso length, body type, head shape, and facial characteristics.

As the user 410 provides inputs to client A 401 to control the movements of the avatar in a VR environment, the inputs are provided to the multi-user server 411. Multi-user server also receives inputs from client B 402 (receiving inputs from user 412) and client C 403 (receiving inputs from user 413). The multi-user server 411 tracks the movements of the avatars and sends avatar data to each of the clients such that each of the users can see other users' avatars when those avatars are visible in the VR environment.

When a user navigates her avatar through a portal into an adjacent 3-D VR room, a message is sent from the client to the cospace server. The cospace server then sends a request to the client browser to display the hypertext file corresponding to the 3-D VR room that the user's avatar is now visiting. In this manner both the client browser and the display of the 3-D VR room are synchronized.

In addition to avatar features, the present invention uses techniques known in the art to advantageously allow users browsing VR environments to communicate with each other. In one embodiment, users in the same room can communicate with each other through a chat channel like a text-based chat window that appears at the bottom of the screen of the users' client computers. Chat channels can be public or private (access restricted). For example, a chat window can be shared by every user in a room, in which case the window is a community window, wherein every input by every user is displayed in the window to every other user by the multi-user server 411. In another embodiment, a user can establish a private chat window by designating the particular other users to whom the private chat window is to be displayed and who can provide input to the chat window. In another embodiment, the user can establish a semi-private chat window in which the user can specify which other users can participate in the chat window, and in which mode each user can participate (e.g., talk and listen or listen only). In another embodiment, users communicate with each other through audio channels. In yet another embodiment, users communicate with each other through video and audio channels.

In one embodiment of the present invention, only users in the same VR room can communicate with each other. In another embodiment, users who are near each other can communicate with each other. Nearness is measured by Euclidean distance, either within a room or in adjacent rooms ("adjacent" in the sense of being connected by a portal). The present invention is advantageously able to indicate the virtual nearness of users. For example, voice communications between users are attenuated such that the voices of users who are nearer sound louder than the voices of users who are further away.

Any combination of the above embodiments of communications between users can be implemented in accordance with the present invention. For example, textual chat windows can be used to augment video communications. Likewise, different users can use different modes of communications. Thus, one user would communicate using video, while another user without a camera can communicate with audio only, and yet another user without a camera or a microphone can communicate using a textual window. In this way, the present invention advantageously accommodates a wide range of users with varied communications capabilities.

A 3-D VR room description can be enhanced with elements (e.g., hypertext links, graphics, etc.) of the file upon which it is based. In one embodiment of the present invention, graphics included in the hypertext file are included as paintings or pictures hung on the wall of the VR environment corresponding to the file. In another embodiment, hypertext links in the original hypertext file appear as portals in the VR environment. Likewise, other features of a hypertext file can be enriched by the additional dimension of the VR environment. For example, a link to an audio file can be represented as a record player in the VR environment; link to a streamed audio source can be described as a radio; a video file, streamed video source, or animation can described as a television. These are examples of ways in which an ordinary link normally presented on a hypertext page as a piece of text or simple graphic can be advantageously enriched in accordance with the present invention, providing the user with a more immediately recognizable reference to the contents of the linked file, and providing an easier to use and more enjoyable interface to the linked file.

The present invention also allows the cospace server to use a pre-existing 3-D VR room description in place of a dynamically-generated 3-D VR room description as follows. If the owner of a hypertext file creates her own 3-D VR room description, she can add a unique tag to her hypertext file that includes a pointer to her 3-D room description. The cospace server will recognize the unique tag and substitute her room description for the room description generated by the cospace server. In one embodiment of the present invention, the cospace server asks the owner's web server to send her room description when it needed to be sent to a client. In another embodiment, the owner sends her room description to the cospace server 409 in advance, whereupon it is stored on database 414 for ready access when it is needed.

The present invention advantageously allows a user browsing hypertext files using a conventional browser at the same time as the cospace server 409 is providing room descriptions that are used to render 3-D VR environments corresponding to the hypertext files to the user. In one embodiment, the present invention displays a conventional two-dimensional view of a requested hypertext document to the user in one window (hereinafter, the conventional window) on the user's screen, and a three-dimensional view in accordance with the present invention to the user in a second window (hereinafter the cospace window) on the user's screen. In one embodiment, the conventional window displays the hypertext file at the same time that the cospace window displays the 3-D VR room corresponding to the hypertext file. Thus, when a user selects a hypertext link in the conventional window and a new hypertext file is displayed therein, a three-dimensional VR room corresponding to the new hypertext file is rendered and displayed in the cospace window. Likewise, when the user causes her avatar to pass through a portal displayed in the cospace window into an adjacent room, the hypertext file corresponding to the adjacent room is displayed two-dimensionally in the conventional window. The ability to synchronously display a three-dimensional VR environment in the cospace window corresponding to what is displayed in the conventional window and vice versa is called the "tracking" feature of the present invention.

In accordance with the present invention, the user can advantageously turn off this tracking feature at will. This is advantageous when updating both windows burdens the processor of the user's client to such an extent as to cause a noticeable slowing of the client's performance, leading to delays between the time a user makes a request and the time the requested hypertext file is fully displayed in both windows. Another advantage of turning off the tracking feature is that it allows a group of communicating visitors (e.g., a tour group) to collectively visit WWW sites while maintaining group communications in the 3-D VR environment.

In accordance with one embodiment of the present invention, the client can toggle the synchrony of the conventional and three dimensional displays. The client sends a synchrony toggle message to the cospace server. If the client is in a state where a requested hypertext file is displayed substantially synchronously with a corresponding three dimensional room, then the cospace server turns the tracking feature off. As used herein, the a hypertext file "corresponds" to a three dimensional room if the three dimensional room was constructed from data from the hypertext file, or to represent the hypertext file. After the tracking feature is turned off, subsequently requested hypertext files are displayed at the client in a conventional format independently from the display of any three dimensional room. In one embodiment, the last rendered three dimensional room continues to be displayed at the client while newly requested hypertext files are displayed in conventional format only. As mentioned above, this can advantageously reduce the burden on the processor, and in some cases speed the browsing process. If, on the other hand, the client is in a state where a requested hypertext file is displayed independently of any three dimensional room, hypertext files requested after the synchrony toggle message is received will be rendered in a conventional format substantially synchronously with corresponding three dimensional rooms. In this fashion, the tracking feature can advantageously by turned on and off. In another embodiment, a synchrony message is sent from the client that contains explicit instructions as to whether to turn the tracking feature on or off.

In another advantageous embodiment of the present invention, a user can be designated as a group leader to the cospace server 409, and a list of other users can be designated as group followers. For example, an expert in art history is designated as a group leader for a tour of paintings on a museum website. As the group leader browses hypertext files containing pictures and annotations of the paintings in the museum, the cospace server requests that the conventional browser of each group follower display the hypertext file being viewed by the group leader. Simultaneously, the cospace browser of the group leader and the group followers all display the same 3-D VR room. The art expert group leader can provide a lecture about each painting to the group in the cospace browser's chat channel. Further, the group followers can communicate among each other while still receiving the communications broadcast by the group leader. Private and semi-private discussions can be established by users. Further, the group leader can switch from broadcasting to users in listen-only mode to talk-and-listen mode, giving the followers a chance to ask questions of the leader at certain times.

Yet another advantageous group feature of the present invention is that group followers can collaboratively decide where to proceed next (which hypertext file to request next) by voting. A follower or the leader proposes a list of next hypertext files or links to select, and each follower votes on which to select. In one embodiment, each follower selects a single file or link. In another embodiment, each follower ranks the files or links from most to least desirable. The cospace server 409 selects the most favorably overall rated link as the next file or link, and sends a request for the file or link to the proxy server 408, which retrieves it and forwards it to the client 401, and sends data from the requested file (e.g., links, graphics, etc.) to the cospace server 509.

Yet another advantageous group feature of the present invention is that a group of participants can arrange to meet in a virtual "meeting room" provided by the cospace server. This virtual meeting room can be enhanced by visiting different WWW sites that have information relevant to the meeting. Such a meeting can be a traditional business-style meeting or a formal or informal meeting of an organization (e.g., shareholder's meeting (formal), social club meeting (informal), dating service, etc.) This group feature can furthermore be enhanced with record keeping functionality, providing continuity and automatic "meeting minutes" to enhance the usefulness of the virtual meeting.

In another advantageous feature of the present invention, a user 410 can indicate through the cospace client software running on client 401 the elements of decoration she would like used to decorate the 3-D VR room currently displayed on her client. Such elements might include custom wallpaper, objects, images of her or her pets, or text messages she desires displayed on the wall of the room. In the current invention, these indications are sent as a message from the client 401 to the cospace server 409, which uses them to decorate the current room. The cospace server can allow multiple users to added decorative items to the room or, alternatively, allow only one user or a group of users to decorate a room.

Figure 5:
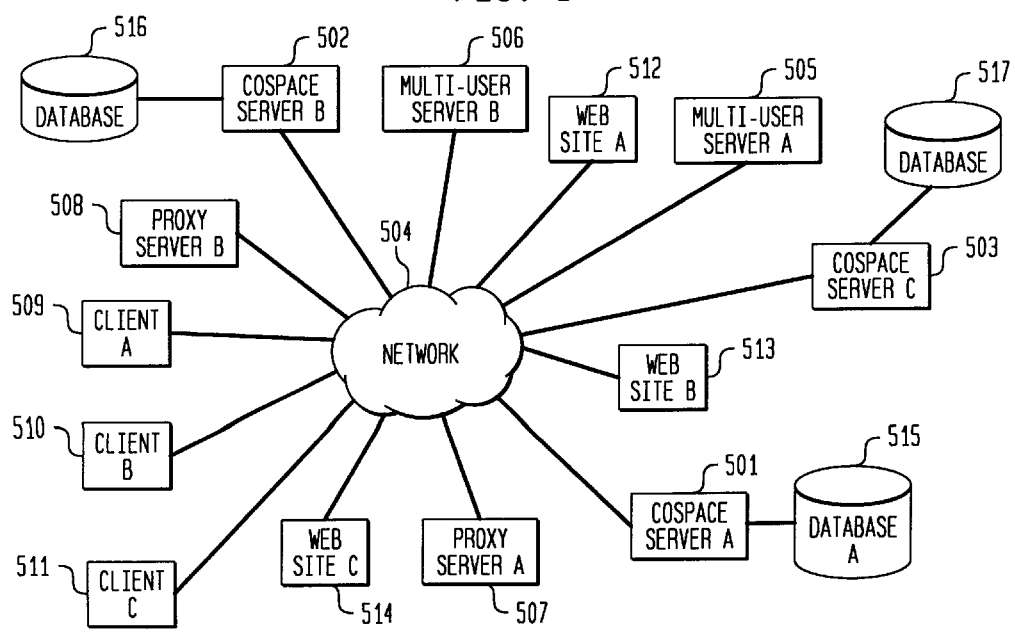
FIG. 5 shows another embodiment of a system that supports shared access to a 3-D virtual environment synchronously with hypertext browsing in accordance with the present invention.

The present invention is not limited to the embodiment shown in FIG. 4. In the embodiment shown in FIG. 5, three cospace servers 501, 502 and 503 are connected to network 504. Two multi-user servers 505 and 506 and two proxy servers 507 and 508 are also connected to the network. These serve clients 509, 510 and 511 accessing websites 512, 513 and 514. In one embodiment, proxy servers 508 and 509 partition the load among cospace servers 501, 502 and 503 with databases 515, 516 and 517, respectively. In one embodiment, the load among multi-user servers 505 and 506 is partitioned along the same lines as the load partitioned among the cospace servers 501, 502 and 503. For example, a cospace server 501 sends the address of a multi-user server with which a client 509 is to communicate (for avatars and communications with other users) along with the VR environment data sent to the client. This embodiment shows that the present invention is advantageously scalable and able to serve large numbers of users.

In one embodiment of the present invention, the cospace server can set the level of granularity at the web server site level, so that all visitors to the hypertext files served by a given site are provided with a 3-D VR room description corresponding to that site, rather than corresponding to the individual hypertext files located at that site. This groups individuals who are visiting a website into a single three dimensional room.

The use of criteria to determine when to construct a 3-D VR room can be further used advantageously as follows. If the cospace server has determined that the number of visitors to a 3-D VR room exceeds a certain threshold (e.g., the room is becoming too crowded), then the cospace server can detect this condition and construct new rooms that are connected to the previous room with portals.

For example, if the granularity level criterion for creating a 3-D VR room is the website, and the 3-D VR room corresponding to a website becomes too crowded, the cospace server can dynamically change the granularity level criterion to be the individual web pages of that website. The cospace server can then create 3-D VR rooms corresponding to each page of that site, and transport the avatars of the current visitors to their corresponding new rooms. This is a mechanism for automatic dynamic "crowd control".

The present invention advantageously adds the richness of a third dimension and social interaction to any conventionally programmed hypertext file browsed by a user. This is advantageously carried out without requiring any changes to the programming of the hypertext file, thus adding to the substantial installed base of hypertext files an interactive, social, 3-D VR environment. The present invention thus flexibly, efficiently and economically provides a richer browsing experience for the user of hypertext files than is currently available with known browsing systems and methods.

What is claimed is:

1. A method for providing shared access to a three dimensional virtual environment synchronously with hypertext browsing, comprising the steps of:
   a. receiving a message indicating a request from a client for a hypertext file;
   b. constructing a virtual three dimensional room description based upon the requested hypertext file, wherein the virtual three dimensional room description comprises portal data that is rendered at the client to a user as a doorway from a first virtual three dimensional room to a second virtual three dimensional room; and
   c. sending the three dimensional room description to the requesting client.

2. The method of claim 1, further comprising the steps of storing and tracking requests from clients for a hypertext file and wherein a virtual three dimensional room corresponding to the requested hypertext file is constructed and sent to the requesting clients only when the number of clients that have requested the hypertext file exceeds a predetermined threshold.

3. The method of claim 1, further comprising the steps of storing a list of addresses of components of a requested hypertext file, retrieving the components when the virtual three dimensional room description is constructed, and using at least one of the components in constructing the virtual three dimensional room description.

4. The method of claim 1, further comprising the steps of storing a virtual room attribute and using the stored virtual room attribute in constructing a virtual three dimensional room description.

5. The method of claim 4, wherein the virtual room attribute is a component of a hypertext page.

6. The method of claim 1, wherein the portal data is private portal data that is sent to a subset of the clients that are browsing a hypertext file.

7. The method of claim 1, wherein the portal data is public portal data that is sent to all of the clients that are browsing a hypertext file.

8. The method of claim 7, wherein public portal data is sent to clients only if the percentage of users that browse the first virtual three dimensional room and then directly browse the second three dimensional virtual room exceeds a predetermined threshold.

9. The method of claim 1, wherein portal data corresponds to a hypertext link in the requested file.

10. The method of claim 1, wherein the room description includes the network address of a multi-user server for tracking and rendering the movements of avatars in a virtual room, and for relaying communications between clients.

11. The method of claim 10, wherein the multi-user server attenuates the volume of an audio communication between two clients according to the virtual distance between their respective avatars.

12. A method for providing shared access to a three dimensional virtual environment synchronously with hypertext browsing, comprising the steps of:
   a. receiving a message indicating a request from a client for a hypertext file;
   b. constructing a virtual three dimensional room description based upon the requested hypertext file, wherein the virtual three dimensional room description comprises portal data that is rendered at the client to a user as a doorway from a first virtual three dimensional room to a second virtual three dimensional room;
   c. sending the three dimensional room description to the requesting client; and
   d. displaying a hypertext file in a conventional two dimensional format at the client, wherein the conventionally displayed hypertext file corresponds to and is displayed substantially synchronously with the three dimensional room.

13. The method of claim 12, wherein the conventionally displayed hypertext file is coupled to the three dimensional room, wherein the conventionally displayed hypertext file corresponds to and is displayed substantially synchronously with the three dimensional room.

14. A method for providing shared access to a three dimensional virtual environment synchronously with hypertext browsing, comprising the steps of:
   a. receiving a message indicating a request from a client for a hypertext file;
   b. constructing a virtual three dimensional room description based upon the requested hypertext file, wherein the virtual three dimensional room description comprises portal data that is rendered at the client to a user as a doorway from a first virtual three dimensional room to a second virtual three dimensional room;
   c. sending the three dimensional room description to the requesting client; and
   d. displaying a hypertext file in a conventional two dimensional format at the client,
   e. receiving a synchrony toggle message from the client;
   f. if, when the synchrony toggle message is received, the conventionally displayed hypertext file corresponds to and is displayed substantially synchronously with a three dimensional room, then conventionally displaying a subsequently requested hypertext file independently from the display of any three dimensional room; and
   g. if, when the synchrony toggle message is received, the conventionally displayed hypertext file is displayed independently from the display of any three dimensional room, then conventionally displaying a subsequently requested hypertext file substantially synchronously with a corresponding three dimensional room.

15. A method for providing shared access to a three dimensional virtual environment synchronously with hypertext browsing, comprising the steps of:
   a. receiving a message indicating a request from a client for a hypertext file;
   b. constructing a virtual three dimensional room description based upon the requested hypertext file;
   c. sending the three dimensional room description to the requesting client; and
   d. receiving a message indicating that a client is a group leader and receiving a message is received indicating that a client is a group follower.

16. The method of claim 15, further comprising the step of sending a virtual three dimensional room description to the group leader and to each group follower.

17. The method of claim 16, wherein the room description includes the network address of a multi-user server for tracking and rendering the movements of avatars of the group leader and the group followers, and for relaying communications between the members of the group.

18. A method for providing shared access to a three dimensional virtual environment synchronously with hypertext browsing, comprising the steps of:
   a. receiving a message correlating a hypertext file to a predetermined virtual three dimensional room description;
   b. receiving a message indicating a request from a client for the hypertext file of step a; and
   c. sending the predetermined virtual three dimensional room description to the requesting client, wherein the virtual three dimensional room description comprises portal data that is rendered at the client to a user as a doorway from a first virtual three dimensional room to a second virtual three dimensional room.

19. A method for providing shared access to a three dimensional virtual environment synchronously with hypertext browsing, comprising the steps of:
   a. receiving a plurality of messages from clients indicating requests for hypertext files from a correlated set of hypertext files;
   b. if the number of clients requesting hypertext files from the correlated set of hypertext files is below a predetermined threshold, then sending a single virtual three dimensional room description to the requesting clients, wherein the virtual three dimensional room description comprises portal data that is rendered at the client to a user as a doorway from a first virtual three dimensional room to a second virtual three dimensional room; and
   c. if the number of clients requesting hypertext files from the correlated set of hypertext files is above a predetermined threshold, then sending a virtual three dimensional room description to each client that corresponds to the hypertext file requested by each such client.

20. The method of claim 19, wherein the correlated set of hypertext files is the collection of hypertext files that comprises a website on the World Wide Web.

21. An apparatus for providing clients connected to a network shared access to a three dimensional virtual environment synchronously with hypertext browsing, comprising:

a. a receiver that receives a message sent from a client;

b. a virtual three dimensional room builder that constructs a three dimensional virtual room based upon a hypertext file requested by a client in a message, wherein the description of the virtual three dimensional room comprises portal data that is rendered at the client to a user as a doorway from a first virtual three dimensional room to a second virtual three dimensional room; and c. a sender that sends the virtual three dimensional room description to a client that requested a hypertext file.

22. The apparatus of claim 21, wherein said sender sends the address of a multi-user server to a client used by the client to track and render the movements of an avatar representing the client in the virtual room rendered to the client from the virtual three dimensional room description, and for communicating with other clients.

23. A system for providing clients connected on a network shared access to a three dimensional virtual environment synchronously with hypertext browsing, comprising:

a. means for receiving a message indicating a request from a client for a hypertext file;

b. means for constructing a virtual three dimensional room description based upon the requested hypertext file, wherein the virtual three dimensional room description comprises portal data that is rendered at the client to a user as a doorway from a first virtual three dimensional room to a second virtual three dimensional room; and c. means for sending the virtual three dimensional room description to the requesting client.

\* \* \* \* \*